(12) United States Patent  
Leonard et al.

(10) Patent No.: US 8,214,846 B1  
(45) Date of Patent: Jul. 3, 2012

(54) METHOD AND SYSTEM FOR THRESHOLD MANAGEMENT

(75) Inventors: Mark Leonard, Olathe, KS (US); Brian John Washburn, Kansas City, MO (US); Kailash Krishnamurthy, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1329 days.

(21) Appl. No.: 11/854,336

(22) Filed: Sep. 12, 2007

(51) Int. Cl.
*G06F 3/00* (2006.01)
*G06F 15/167* (2006.01)

(52) U.S. Cl. ........... 719/314; 719/318; 710/54; 709/213

(58) Field of Classification Search .................. None
See application file for complete search history.

(56) References Cited

U.S. PATENT DOCUMENTS

| | | | |
|---|---|---|---|
| 6,434,605 B1* | 8/2002 | Faulkner et al. | 709/213 |
| 2003/0050956 A1* | 3/2003 | Janssen et al. | 709/201 |
| 2003/0110249 A1* | 6/2003 | Buus et al. | 709/224 |
| 2003/0177412 A1* | 9/2003 | Todd | 714/25 |
| 2005/0228900 A1* | 10/2005 | Stuart et al. | 709/234 |
| 2007/0288157 A1* | 12/2007 | Peterman | 701/207 |

* cited by examiner

*Primary Examiner* — Andy Ho  
*Assistant Examiner* — Tuan Dao

(57) ABSTRACT

One or more computer-readable media that enable a method of recording object configurations at and after an incident occurs in the object. The present invention captures object configurations surrounding an incident that allows changes to be made in response to the incident to be analyzed. The present invention also may generate an incident classification based on a comparison of the configuration when the incident occurs and after it is resolved.

15 Claims, 4 Drawing Sheets

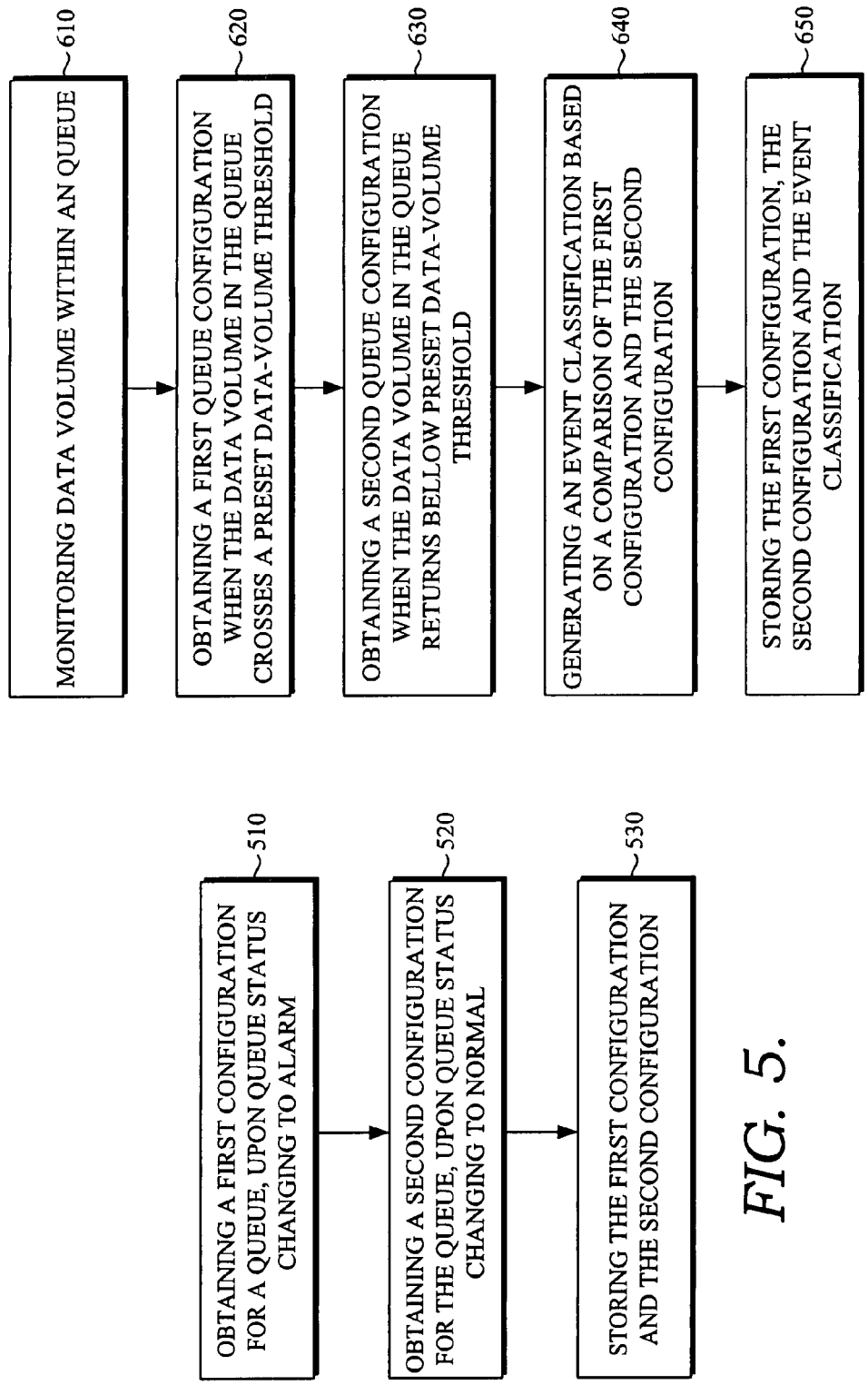

METHOD AND SYSTEM FOR THRESHOLD MANAGEMENT

CROSS-REFERENCE TO RELATED APPLICATIONS

Not applicable.

SUMMARY OF THE INVENTION

The present invention is defined by the claims below. Embodiments of the present invention provide a system and method for recording object configurations surrounding a threshold incident. These configurations are further classified and stored for subsequent evaluation. The present invention offers several practical applications in the technical arts, including capturing and classifying data that can be used to improve threshold settings in a messaging-middleware monitoring application.

In a first illustrative embodiment, a set of computer-executable instructions provide a method of recording changes made to an application configuration. The method includes obtaining a first threshold-incident message for an object, then obtaining a first configuration for the same object. Next, a second incident message is obtained and then a second configuration for the object is obtained. Finally, an event classification is generated by comparing the first configuration and the second configuration. The event classification is stored along with the first and second configuration.

In another illustrative embodiment, a set of computer-executable instructions provides for performing a method of recording changes made to a queue in response to a status incident. The method includes obtaining a first configuration for a queue when the queue status changes to alarm and obtaining a second configuration for the queue when the queue status changes to normal. The first and second configurations are then stored for later use.

In a final illustrative embodiment, a set of computer-executable instructions provide for a method of gathering configuration data related to a threshold incident. The method includes monitoring the data volume within an queue and obtaining a first queue configuration when the data volume crosses a preset threshold. When the data volume in the queue returns below the preset data-volume threshold then a second queue configuration is obtained. Finally, an event classification is generated by comparing the first configuration and the second configuration. The event classification is stored along with the first and second configuration.

BRIEF DESCRIPTION OF THE SEVERAL VIEWS OF THE DRAWINGS

The present invention is described in detail below with reference to the attached drawing figures, wherein:

FIG. 5 is a flow diagram showing a method of recording changes made to an queue configuration in response to an alarm; and FIG. 6 is a flow diagram showing a method of data gathering related to threshold incident messages.

DETAILED DESCRIPTION

Figure 1:
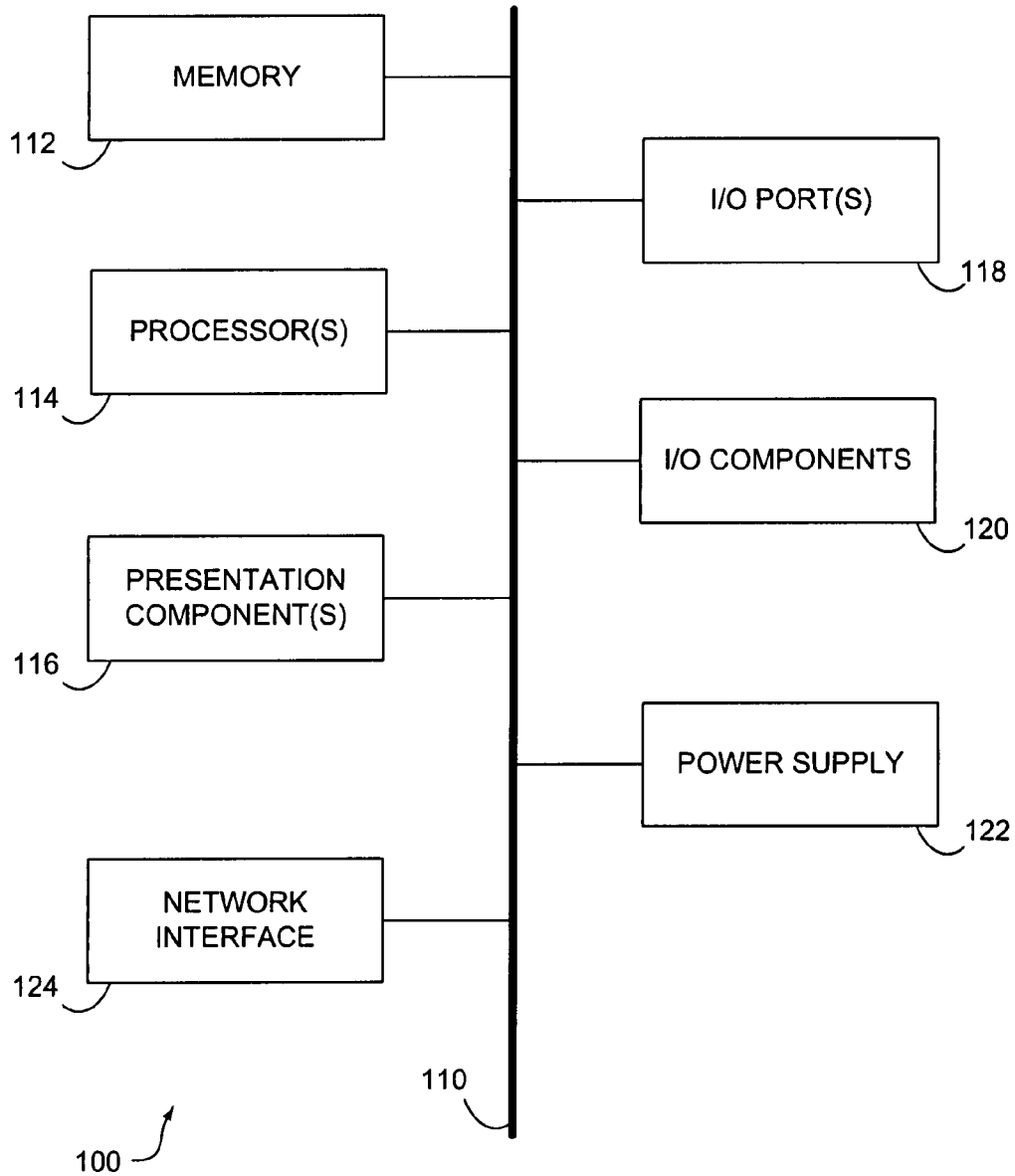
FIG. 1 is a block diagram of an operating environment suitable for use in implementing the present invention.

The present invention will be better understood from the detailed description provided below and from the accompanying drawings of various embodiments of the invention, which describe, for example, media for capturing the configuration of an object before and after a threshold event involving the object. The detailed description and drawings, however, should not be read to limit the invention to the specific embodiments. Rather, these specifics are provided for explanatory purposes that help the invention to be better understood.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Exemplary Operating Environment

As stated above, the present invention may be embodied as, among other things: a method, system, or computer-program product that is implemented as software, hardware or a combination of the two, or as a computer-readable media having computer usable instructions embodied thereon. In these embodiments, the exemplary operating environment may be as simple as a single computing device. Examples of wellknown computing devices that may be suitable for use with the invention include, but are not limited to, personal computers, server computers, hand-held or laptop devices, multiprocessor systems, microprocessor-based systems, set top boxes, programmable consumer electronics, network personal computers (PCs), minicomputers, and mainframe computers. All of these devices are well known to those having ordinary skill in the art, thus, are not described in detail herein.

More commonly, embodiments of the present invention will be practiced in a distributed computing environment where computing devices are communicatively interconnected through a local-area network (LAN) or a wide-area network (WAN) including the Internet.

Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant (PDA) or other handheld device. Generally, program modules including routines, programs, objects, components, data structures, and the like, refer to code that performs particular tasks or implements particular abstract data types. Each module described herein may represent executable source code written in a well-known language, such as, for example, C, C++, C#, Java, or the like.

Embodiments described herein may be practiced in a variety of system configurations, such as, for example, computing device 100. Embodiments described herein may also be practiced in distributed computing environments where tasks are performed by remote-processing devices that are linked through a communications network. For example, a computing device 100 may communicate with a server to accomplish different aspects of the embodiments described herein.

With continued reference to FIG. 1, computing device 100 includes a bus 110 that directly or indirectly couples the following devices: memory 112, one or more processors 114, one or more presentation components 116, input/output ports 118, input/output components 120, an illustrative power supply 122, and a network connection 124. Bus 110 represents what may be one or more buses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an input/output (I/O) component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Network connection 124, allows the computing device to connect to a network. The network connection may be a modem, a network interface, a wireless connection or an optical fiber interface.

Figure 2:
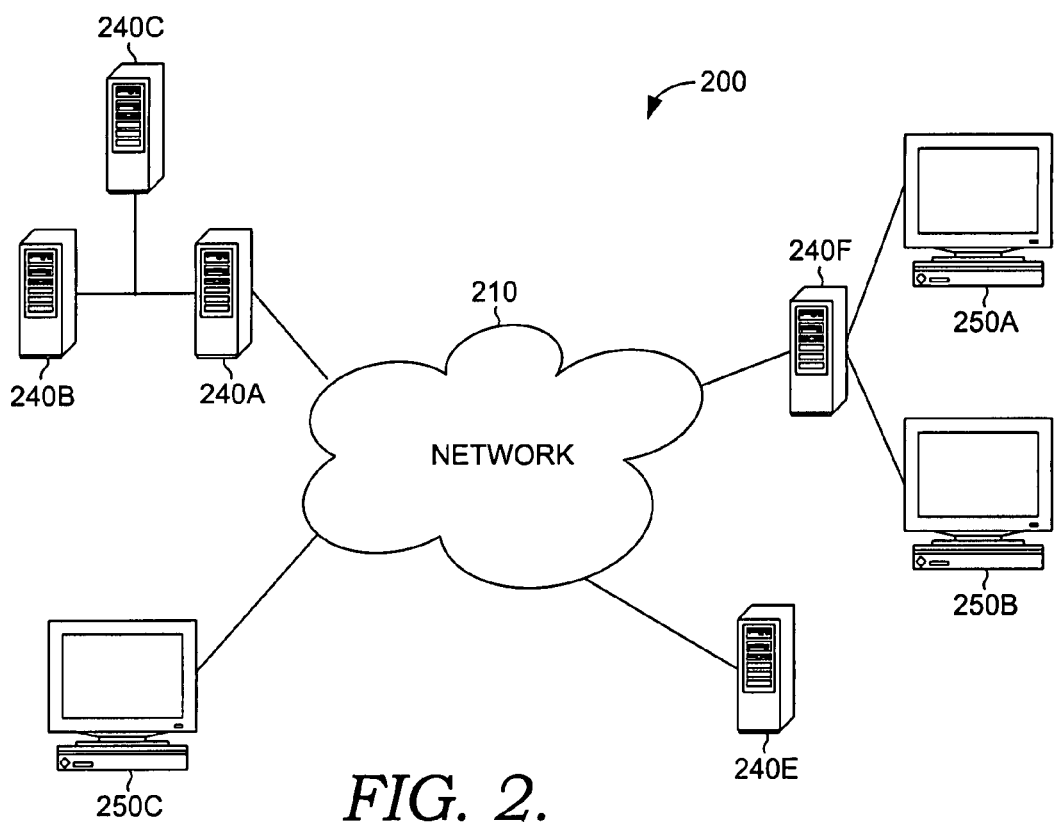
FIG. 2 is a block diagram of second operating environment suitable for use in implementing the present invention.

Turning now to FIG. 2, a block diagram depicting a networking architecture 200 is shown for use in implementing an embodiment of the present invention in a distributed computing environment. The networking architecture 200 comprises client computing devices 250A, 250B, and 250C, servers 240A, 240B, 240C, 240E and 240F, all of which communicate with each other via network 210. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

The client computing devices 250A, 250B, and 250C may be a type of computing device, such as device 100 described above with reference to FIG. 1. By way of example only and not limitation, the client computing devices 250A, 250B, and 250C may be a personal computer, desktop computer, laptop computer, handheld device, cellular phone, consumer electronic, digital phone, smartphone, PDA, or the like. It should be noted that embodiments are not limited to implementation on such computing devices.

Network 210 may include a computer network or combination thereof. Examples of networks configurable to operate as network 210 include, without limitation, a wireless network, landline, cable line, digital subscriber line (DSL), fiber-optic line, local area network (LAN), wide area network (WAN), metropolitan area network (MAN), or the like. Network 210 is not limited, however, to connections coupling separate computer units. Rather, network 210 may also comprise subsystems that transfer data between servers or computing devices. For example, network 210 may also include a point-to-point connection, the Internet, an Ethernet, an electrical bus, a neural network, or other internal system. Furthermore, network 210 may include a WiMAX-enabled infrastructure (i.e., components that conform to IEEE 802.16 standards).

In an embodiment where network 210 comprises a LAN networking environment, components are connected to the LAN through a network interface or adapter. In an embodiment where network 210 comprises a WAN networking environment, components use a modem, or other means for establishing communications over the WAN, to communicate. In embodiments where network 210 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

Furthermore, network 210 may also include various components necessary to facilitate communication with a mobile phone (e.g., cellular phone, Smartphone, Blackberry®). Such components may include, without limitation, switching stations, cell sites, Public Switched Telephone Network interconnections, hybrid fiber coaxial cables, or the like.

The servers 240A-F may be a type of application server, database server, or file server configurable to perform the methods described herein. In addition, each of the servers 240A-F may be a dedicated or shared server. One example, without limitation, of a server that is configurable to operate as servers 240A-F is a PowerEdge® server manufactured by Dell, Inc. headquartered in Round Rock, Tex. The servers 240A-F may also be configured to run server software, such as SQL Server® 2005, which was developed by the Microsoft® Corporation of Redmond, Wash., or Apache HTTP Server Project, developed by the Apache Software Foundation.

Components of the servers 240A-F may include, without limitation, a processing unit, internal system memory, and a suitable system bus for coupling various system components, including one or more databases for storing information (e.g., files and metadata associated therewith). Each server may also include, or be given access to, a variety of computer-readable media. By way of example, and not limitation, computer-readable media may include computer-storage media and communication media. In general, communication media enables each server to exchange data via network 210. More specifically, communication media may embody computer-readable instructions, data structures, program modules, or any information-delivery media. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the servers 240A-F are illustrated as single boxes, one skilled in the art will appreciate that they are scalable. For example, the server 240D may in actuality include multiple boxes in communication as illustrated by servers 240A-C. The single unit depictions are meant for clarity, not to limit the scope of embodiments in any form.

Figure 3:
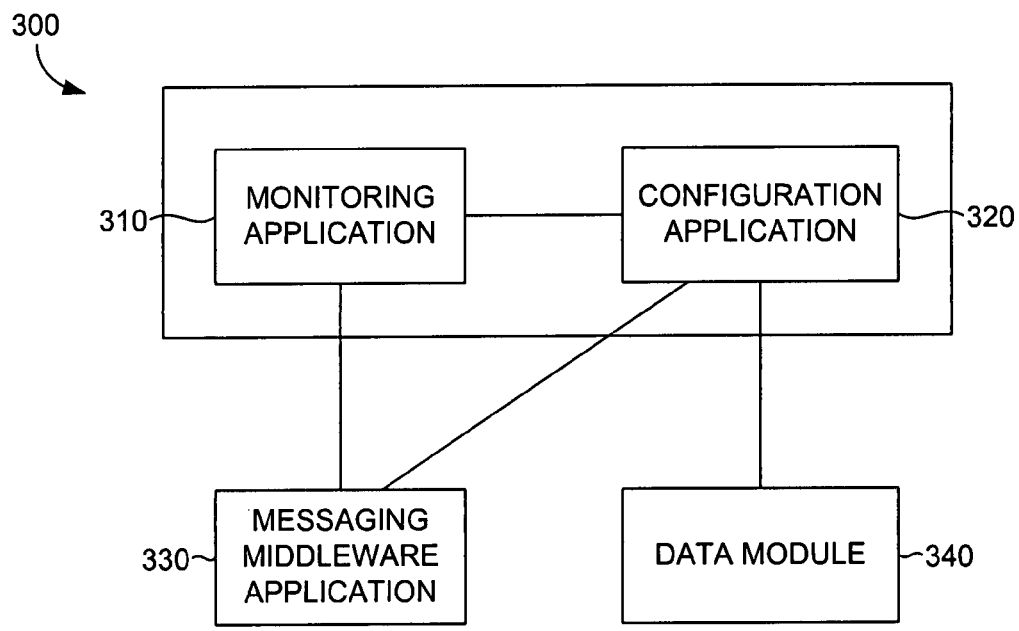
FIG. 3 is a system diagram of a computing environment suitable for implementing the present invention.

Turning now to FIG. 3, a system diagram illustrating a computing environment suitable for practicing the present invention is shown. The system 300 includes a monitoring application 310 and configuration application 320 that are located on computing device 305. The monitoring application 310 is communicatively connected to a messaging-middleware application 340. The configuration application 320 is communicatively connected to a data store 330.

Computing device 305 may be a computing device as described above with reference to FIG. 1. The messaging-middleware application 340 and data store 330 may also reside on computing device 305, or they may be dispersed on one or more computing device communicatively connected to computing device 305 as is shown. The messaging-middleware application 340 and data store may reside on computing devices that are communicatively connected to computing device 305 by a network 210.

Messaging-middleware applications 340 (a.k.a message-oriented middleware) are commonly used to transfer data between two or more separate applications. Examples of commercially available messaging-middleware applications include IBM's WebSphere® MQ (formerly MQ Series®), Fiorano's MQ, Oracle Advanced Queuing (AQ), and Microsoft's MSMQ. The messaging-middleware application 340 uses queues to transfer messages from one application to another. For example, application A may need to send a message to application B. The message from application A is placed in a sending queue, within the messaging-middleware application 340, and transferred by the messaging-middleware application 340 into a receiving queue that is also within the messaging-middleware application 340. Program B then retrieves the message from the receiving queue. The message is transmitted through channels within the messaging-middleware application. In this example, programs A or B could be located on any computing device communicatively connected to the one or more computing devices (not shown) on which the messaging-middleware application 340 is located. The messaging middleware application may reside on computing device 305, but may also operate on one or more other computing devices communicatively connected to computing device 305 through a network 210.

The monitoring application 310 monitors designated values within messaging-middleware objects, including channels and queues. Examples of commercially available monitoring applications include HP Openview®, Q Pasa!® by MQSoftware, Candle's PathWAI and BMC Patrol. The monitoring application 310 monitors the messaging-middleware objects for threshold events. A threshold event occurs when a monitored value within the object crosses a designated value. When a threshold event occurs, the monitoring application 310 generates a threshold incident message and transmits it to a designated responder. The designated responder may make changes to the object configuration to resolve the threshold incident. A responder is a person or program with the responsibility to resolve the threshold incident.

The configuration component 320 may be a plug-in to the monitoring application 310 or otherwise be integrated with the monitoring application 310. The configuration application 320 captures object configurations at the start of a threshold event and after the threshold event is resolved. The function of the configuration application will be explained in more detail with reference to FIGS. 4-6.

The data store 330 stores data structures that correlate to object configurations and incident classifications The data store may reside on computing device 305, but may also be located on one or more other computing devices communicatively connected to computing device 305 through network 210.

More Precise Invention Aspect

Figure 4:
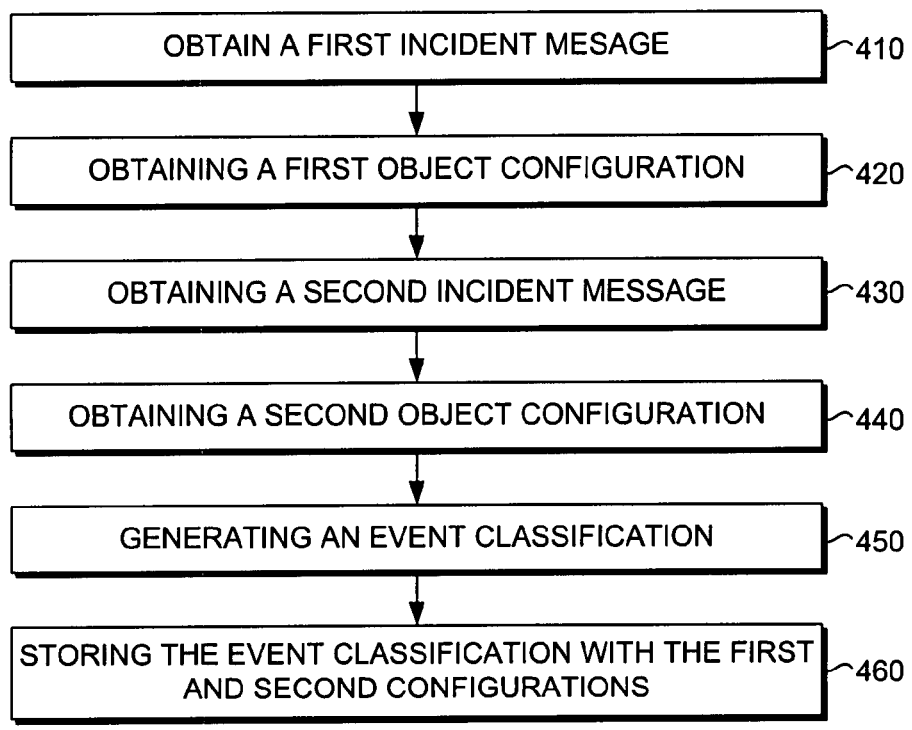
FIG. 4 is a flow diagram showing a method of recording changes made to an object configuration in response to incident.

With reference to FIG. 4, a method 400 of recording changes made to an object configuration in response to an incident is shown. Method 400 is performed by the configuration application 320 running on computing device 305. By way of background, objects within a messaging-middleware application 330 may be monitored by a monitoring application 310 to detect potential problems. The monitoring application 310 monitors one or more object values and generate an incident message when changes to one or more object values indicate a potential problem The incident message is sent to a designated responder that may take corrective action to resolve the incident. Corrective action that may be made in response to the incident includes making changes to the object's configuration.

At step 410, an incident message for an object is obtained by the configuration application 320. As stated, an incident message is generated when a possible problem with an object is detected by a monitoring application 310. The incident message is sent to the configuration application 320 at the same time the incident message is sent to a designated responder. The monitored object may be a queue or a channel within a messaging-middleware application 330. In one embodiment, the incident message is generated when a data volume within a queue exceeds a preset data threshold. The queue may be a receiving queue in an messaging-middleware application 330. In another embodiment, the incident message is generated when the status of a channel changes. Possible channel statuses include normal, inactive, retry, binding, paused, stopping, stopped, running, and initializing. An incident message would only be generated if the change to the channel status indicates a potential problem, such as a retry or binding.

At step 420, a first configuration for the object that was the subject of the incident message is obtained by the configuration application 320. The first configuration reflects the configuration of the object at the time the incident occurred. The configuration application 320 is communicatively connected to the messaging-middleware application 330 and thereby retrieves the object configuration. The extent of the access must be sufficient to identify objects named in the incident message and read the object's configuration.

At step 430, the configuration application 320 obtains a second incident message. The second incident message indicates that the object value has returned to normal, thus, the incident has been resolved. At step 440, the configuration application 320 obtains a second object configuration. The second object configuration reflects the configuration of the object after the incident has been resolved. As stated above, the configuration application 320, obtains the object configuration using the access it has to the messaging-middleware application 330. The extent of the access must be sufficient to identify the object named in the incident message and read the object's configuration.

At step 450, the configuration application generates an incident classification by comparing the first and second configurations. The incident classification is based on the type of changes, if any, that were made to the object configuration in order to resolve the incident. The first incident classification is "threshold." An incident is classified as threshold when the first and second object configurations are identical. When the first and second object configurations are identical, this indicates that the incident was resolved without making object configuration changes. When the incident is resolved without making changes to the object configuration, this may indicate that the incident message was a false alarm. If a false alarm is generated, the alarm value, which causes the incident message to be generated, may be too low and should be re-evaluated to avoid future false alarms.

A second incident classification is application-override. An incident is classified as an application-override when comparison of the first and second configurations show that additional handles have been added. Handles are connections between the object and the receiving application. The application-override incident classification is particularly relevant when the object is a queue within a messaging-middleware application 330.

A third incident classification is put-inhibited. An incident is classified as put-inhibited when changes to the object configuration show the incident was generated when the application could not write to the object. The put-inhibited incident classification is particularly relevant when the object is a queue within a messaging-middleware application 330.

A fourth incident classification is get-inhibited. An incident is classified as get-inhibited when changes to the object configuration show the incident was generated when the application could not read from the object. The get-inhibited incident classification is particularly relevant when the object is a queue within a messaging-middleware application 330.

A fifth type of incident classification is queue definition. An incident is classified as queue definition when changes to a queue configuration shows that one or more definitions were changed. Examples of definitions within a messaging-middleware queue includes Process, InitQ, Trigger, Trigger depth, Message Delivery Sequence, Trigger Type, and Trigger Priority. The queue definition incident classification is only applicable when the object is a queue.

A sixth type of incident classification is system/network. This incident classification is applicable to channels within a messaging-middleware application 330. An incident is classified as system/network if the subject of the incident message is a channel and no changes were made to the channel configuration. The system/network classification indicates that there was a problem with the system or network that prevented the transfer of messages, rather than a problem with the messaging-middleware application 330.

A seventh type of incident classification is channel definition. An incident is classified as channel definition if the subject of the incident message is a channel, and changes were made to one or more channel definitions. An example of a channel definition that might be changed is the batch size.

Having obtained a first and second configuration and generated an event classification based on changes between the first and second configuration, at step 460, the threshold-management application will store the first and second configuration with the event classification. These items will be stored in a data store 340 that is accessible to the configuration application 320. The items are classified within the data store as related to a single incident. This may be done, by assigning the same unique incident ID, to the first configuration, the second configuration, and the incident classification.

With reference to FIG. 5, a method 500 of recording changes made to a queue configuration in response to an alarm is shown. Method 500 is performed by the configuration application 320 running on computing device 305. By way of background, queues within a messaging-middleware application 310 may be monitored by a monitoring application 310 to detect potential problems. The monitoring application 310 monitors one or more queue values and generate an incident message when changes to one or more queue values indicate a potential problem The incident message is sent to a designated responder that may take corrective action to resolve the incident. Corrective action that may be made in response to the incident includes making changes to the queue configuration.

At step 510, the configuration application obtains a first queue configuration when the status of a monitored queue value changes from normal to alarm. In one embodiment, the monitored value is the data volume within the queue. In this embodiment, the status will change from normal to alarm when the data within the queue crosses a preset data volume threshold. The change of the queue status from normal to alarm is called an incident. The first configuration reflects the configuration of the queue at the time the status changed from normal to alarm. The configuration application 320, obtains the object configuration using the access it has to the messaging-middleware application 330. The extent of the access must be sufficient to identify the object named in the incident message and read the object's configuration.

At step 520, the configuration application 320 obtains a second configuration when the queue status changes from alarm back to normal. The second object configuration reflects the configuration of the queue after the incident has been resolved. As stated above, the configuration application 320, obtains the object configuration using the access it has to the messaging-middleware application 330. The extent of the access must be sufficient to identify the object named in the incident message and read the object's configuration.

At step 530, the configuration application 320 stores the first and second configuration in data store 340. The configurations may be retrieved later for automated or manual analysis of the incident. The incident may be classified based on the changes made to the queue configuration to resolve the incident. Several such classifications that are common to method 600 are described after the description of method 600.

With reference to FIG. 6, a method 600 of data gathering related to threshold incident messages is shown. Method 600 is performed by the monitoring application 310 and the configuration application 320 running on computing device 305. By way of background, queues within a messaging-middleware application 330 may be monitored by a monitoring application 310 to detect potential problems. The monitoring application 310 monitors the data volume within queues and generates a threshold-incident message when the data volume within a queue crosses a preset threshold. The threshold-incident message is sent to a designated responder that may take corrective action to resolve the threshold-incident. Corrective action that may be made in response to the incident includes making changes to the queue configuration.

At step 610, the monitoring application 310 monitors the data volume within a queue. In one embodiment, the queue is a receiving queue within the messaging-middleware application 310. At step 620, the configuration application 320 obtains a first queue configuration when the data volume within the queue crosses a preset data threshold. The first configuration captures the queue configuration at the time the threshold incident begins. The configuration application 320, obtains the object configuration using the access it has to the messaging-middleware application 330. The extent of the access must be sufficient to identify the object named in the incident message and read the object's configuration.

At step 630, the configuration application 320 obtains a second queue configuration when the data volume within the queue returns to normal. The second queue configuration captures the queue configuration just after the threshold incident has been resolved. As stated above, the configuration application 320, obtains the object configuration using the access it has to the messaging-middleware application 330. The extent of the access must be sufficient to identify the object named in the incident message and read the object's configuration.

At step 640, the configuration application 320 generates an incident classification by comparing the first and second configuration. The incident classification is based on the type of changes, if any, that were made to the object configuration in order to resolve the threshold incident. Several such classifications are described in subsequent paragraphs.

At step 650, the configuration application stores the first configuration, the second configuration, and the incident classification in a data store 340. In one embodiment, the data store 340 is a database. The database may be a consolidated database that has the capacity to store all data from all of the threshold incidents that occur within a messaging-middleware application 330.

The following incident classifications may be applied to an incident classification generated as part of the method 500 and 600. Other classifications are also possible. The first incident classification is "threshold." An incident is classified as threshold when the first and second queue configurations are identical. When the first and second queue configurations are identical, this indicates that the incident was resolved without making queue configuration changes. When the incident is resolved without making changes to the queue configuration, this may indicate that the alarm value, which causes the incident message to be generated, is incorrect and should be re-evaluated to avoid future false alarms.

A second incident classification is application-override. An incident is classified as an application-override when comparison of the first and second configurations show that additional handles have been added. Handles are connections between the queue and the receiving application.

A third incident classification is put-inhibited. An incident is classified as put-inhibited when changes to the queue configuration show the incident was generated when the application could not write to the queue.

A fourth incident classification is get-inhibited. An incident is classified as get-inhibited when changes to the queue configuration show the incident was generated when the application could not read from the queue.

A fifth type of incident classification is queue definition. An incident is classified as queue definition when changes to a queue configuration shows that one or more definitions were changed. Examples of definitions within a messaging-middleware queue includes Process, InitQ, Trigger, Trigger depth, Message Delivery Sequence, Trigger Type, and Trigger Priority.

In conjunction with methods 400, 500, and 600, a notification message could be sent that communicates an incident has been classified. The notification message could be sent to a designated responder or other person or program. Generating and sending the notification message would be particularly desirable when the incident indicates that a threshold setting or object setting should be evaluated.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A non-transitory computer-readable storage media with instructions embodied thereon for performing a method of recording changes made to a queue configuration, the method comprising:
   obtaining a first incident message for a queue that communicates that a data volume within the queue has crossed above a threshold,
   obtaining a first configuration for the queue when the first incident message is obtained;
   obtaining a second incident message for the queue that communicates that the data volume within the queue has returned to a normal value;
   obtaining a second configuration for the queue when the second incident message is obtained;
   generating an incident classification by comparing the first configuration and the second configuration; and
   storing the first configuration, the second configuration, and the incident classification in a data store.

2. The media of claim 1 wherein the queue is a queue in a messaging-middleware application.

3. The media of claim 2, wherein the queue is a receiving queue.

4. The media of claim 1, wherein the incident classification indicates whether a setting that triggers the incident message is correct.

5. The media of claim 1, wherein a basis for the incident classification includes at least one of:
- making no queue configuration changes;
- adding additional handles;
- encountering a problem retrieving data from queue;
- encountering a problem writing data to the queue; and
- making a change to a queue definition.

6. A non-transitory computer-readable storage media with instructions embodied thereon for performing a method of recording changes made to a queue configuration in response to a status change, the method comprising:
- obtaining a first message indicating a queue status has changed to alarm;
- obtaining a first configuration for a the queue when the queue status changes to alarm when a data volume within the queue crosses a preset threshold;
- obtaining a second message indicating the queue status has returned to normal;
- obtaining a second configuration for the queue when the queue status changes to normal when the data volume within the queue crosses from above the preset threshold to below the preset threshold;
- generating an incident classification for the status change incident by comparing the first and the second configuration; and
- storing the incident classification, the first configuration and the second configuration in a data store.

7. The media of claim 6, wherein the queue comprises a receiving queue in a messaging-middleware application.

8. The media of claim 6, wherein the basis for the incident classification is adding additional handles to the queue.

9. The media of claim 8, wherein the basis for the incident classification includes at least one of:
- making no queue configuration changes;
- adding additional handles;
- encountering a problem retrieving data from a queue;
- encountering a problem writing data to the queue; and
- making a change to a queue definition.

10. A non-transitory computer-readable storage media with instructions embodied thereon for performing a method of gathering data related to a threshold incident, the method comprising:
- monitoring data volume within a queue;
- determining that the data volume in the queue crosses a preset-data-volume threshold;
- obtaining a first queue configuration when the data volume in the queue crosses the preset-data-volume threshold;
- determining that the data volume in the queue returns below the preset data-volume threshold;
- obtaining a second queue configuration when the data volume in the queue returns below the preset data-volume threshold;
- generating an incident classification of the threshold incident based on a comparison of the first queue configuration and the queue second configuration; and
- storing the first queue configuration, the second queue configuration and the incident classification in a data store.

11. The media of claim 10, wherein the queue is a receiving queue in a messaging-middleware application.

12. The media of claim 10, wherein the basis for the incident classification includes at least one of:
- making no queue configuration changes;
- adding additional handles;
- encountering a problem retrieving data from a queue;
- encountering a problem writing data to the queue; and
- making a change to a queue definition.

13. The media of claim 12, further comprising:
- generating a threshold message when basis for the incident classification is making no queue configuration changes, wherein the message references the threshold incident and indicates that the threshold should be evaluated; and
- transmitting the threshold message to a system administrator.

14. The media of claim 13, wherein the first queue configuration, the second queue configuration and the incident classification are stored in a database.

15. The media of claim 14, wherein the database is a consolidated database that is configured to store the first queue configuration, the second queue configuration and the incident classification for every threshold incident generated by a monitoring solution.

* * * * *